United States Patent
Litvin

(10) Patent No.: US 10,430,993 B2
(45) Date of Patent: Oct. 1, 2019

(54) IMAGE GENERATION VIA COMPUTED TOMOGRAPHY SYSTEM

(71) Applicant: Analogic Corporation, Peabody, MA (US)

(72) Inventor: Andrew Litvin, Stoneham, MA (US)

(73) Assignee: Analogic Corporation, Peabody, MA (US)

( * ) Notice: Subject to any disclaimer, the term of this patent is extended or adjusted under 35 U.S.C. 154(b) by 22 days.

(21) Appl. No.: 15/320,324

(22) PCT Filed: Jun. 20, 2014

(86) PCT No.: PCT/US2014/043344
§ 371 (c)(1),
(2) Date: Dec. 20, 2016

(87) PCT Pub. No.: WO2015/195133
PCT Pub. Date: Dec. 23, 2015

(65) Prior Publication Data
US 2017/0161935 A1   Jun. 8, 2017

(51) Int. Cl.
*G06K 9/00* (2006.01)
*G06T 15/08* (2011.01)
(Continued)

(52) U.S. Cl.
CPC .......... *G06T 15/08* (2013.01); *G06T 7/0004* (2013.01); *G06T 11/005* (2013.01);
(Continued)

(58) Field of Classification Search
None
See application file for complete search history.

(56) References Cited

U.S. PATENT DOCUMENTS

2012/0177273 A1   7/2012   Naidu et al.
2013/0064440 A1*  3/2013   Wiemker ............... G06T 15/08
                                              382/131

FOREIGN PATENT DOCUMENTS

CN   1278357 A   12/2000
CN   102100566 A   6/2011
(Continued)

OTHER PUBLICATIONS

EP Communication cited in EP Application No. 14 741 458.5 dated Jan. 2, 2018, 3 pgs.
(Continued)

*Primary Examiner* — Atiba O Fitzpatrick
(74) *Attorney, Agent, or Firm* — TraskBritt

(57) ABSTRACT

Among other things, computed tomography (CT) systems and/or techniques for generating projections images of an object(s) under examination via a CT system are provided. The projection images of the object may represent a projection of the entire object or merely a portion of the object, such as a slice of the object. A surface about which the projection image is focused is defined and data yielded from a plurality of views of the object is mapped to the surface. In some embodiments, such a mapping comprises mapping data corresponding to a first view and yielded from a first detector cell to a first point on the surface, mapping data corresponding to the first view and yielded from a second detector cell to a second point on the surface, and/or mapping data corresponding to a second view and yielded from the first detector cell to a third point on the surface.

15 Claims, 8 Drawing Sheets

(51) Int. Cl.
    *G06T 7/00*           (2017.01)
    *G06T 11/00*         (2006.01)
    *G06T 15/04*         (2011.01)
    *G06T 15/20*         (2011.01)

(52) U.S. Cl.
    CPC ............ *G06T 11/008* (2013.01); *G06T 15/04* (2013.01); *G06T 15/20* (2013.01); *G06T 2207/30112* (2013.01); *G06T 2211/436* (2013.01)

(56) References Cited

FOREIGN PATENT DOCUMENTS

CN       102232227 A     11/2011
WO     2014209281 A1     12/2014

OTHER PUBLICATIONS

Written Opinion of the International Search Authority dated Feb. 26, 2015 for WO Application No. PCT/US14/043344.
CN Office Action dated Oct. 15, 2018 for CN Application No. 201480079001.
International Search Report cited in related application No. PCT/US14/43344 dated Feb. 26, 2015, pp. 9.
European Search Report and Search Opinion Received for EP Application No. 19151081.7, dated Apr. 17, 2019, 6 pages.
CN Office Action for CN Application No. 201480079001, dated Jun 11, 2019, 10 pages.

* cited by examiner

IMAGE GENERATION VIA COMPUTED TOMOGRAPHY SYSTEM

TECHNICAL FIELD

The present application relates to radiation systems. It finds particular application in the context of security imaging, where it may be desirable to display high resolution two-dimensional (2D) images representative of an object to security personnel while utilizing volumetric data representative of the object for automated threat detection. However, it may also find applicability in medical fields, industrial fields, and/or other fields where radiation systems are employed to examine/image an object.

BACKGROUND

Today, radiation imaging systems such as computed tomography (CT) systems, single-photon emission computed tomography (SPECT) systems, digital projection systems, and/or line-scan systems, for example, are useful to provide information, or images, of interior aspects of an object under examination. The object is exposed to rays of radiation photons (e.g., x-ray photons, gamma ray photons, etc.) and radiation photons traversing the object are detected by a detector array positioned substantially diametrically opposite a radiation source relative to the object. A degree to which the radiation photons are attenuated by the object (e.g., absorbed, reflected, etc.) is measured to determine one or more properties of the object, or rather aspects of the object. For example, highly dense aspects of an object typically attenuate more radiation than less dense aspects, and thus an aspect having a higher density, such as a bone or metal, for example, may be apparent when surrounded by less dense aspects, such as muscle or clothing.

Radiation imaging systems are utilized in a variety of fields to image/examine aspects of an object not readily visible to the naked eye. For example, radiation imaging systems are used in security applications to identify potential threat items, including weapons and/or explosives, concealed within a suitcase or other object, for example.

Two of the more common types of radiation imaging systems used in security applications are CT systems and line-scan systems. Line-scan systems are configured to view the object from a limited number of view-angles (e.g., typically 1 view-angle) and generate projection images (e.g., 2D images) respectively representing a collapsed or flattened, 2D view of the object (e.g., where the densities of aspects of an object through a line in which radiation travels are integrated and represented as a single point on the 2D image). Such systems are particularly valuable for generating high resolution 2D images for display to security personnel responsible for identifying potential threat objects.

CT systems are configured to view an object from a greater number of view-angles than line-scan systems and to generate volumetric data representative of the object. In this way, a three-dimensional (3D) image of the object can be created and properties of respective aspects within the object, such as density information, z-effective information, shape characteristics, etc., can be determined. Using one or more of these properties, automated threat analysis can be performed to determine if the object is a potential threat item. Moreover, 2D projection images or 3D volumetric images can be obtained from CT systems that are representative of the object (e.g., although typically such images are of a lower resolution than the projection images generated by line-scan systems due to, among other things, differences in the resolution of CT detector arrays relative to detector arrays utilized in line-scan systems).

While automatic threat analysis algorithms have proven useful to identify potential threat items, it is sometimes desirable for a security screener to view images of the objects or aspects concealed therein. Accordingly, the resolution of images produced by a radiation imaging system is sometimes an important consideration when selecting whether to implement a line-scan system or a CT system in an environment.

BRIEF SUMMARY

Aspects of the present application address the above matters, and others. According to one aspect, a method for generating a projection image from volumetric data is provided. The method comprises acquiring volumetric data yielded from an examination of an object via radiation and defining a surface about which a projection image of the object is focused. The method also comprises mapping a first portion of the volumetric data, corresponding to a first view, to the surface and mapping a second portion of the volumetric data, corresponding to a second view, to the surface. The method further comprises generating a projection image based upon the mapping a first portion and the mapping a second portion.

According to another aspect, a method for generating a projection image from volumetric data is provided. The method comprises acquiring volumetric data yielded from an examination of an object via radiation and defining a surface about which a projection image of the object is focused. The method also comprises, for a first view, determining a first trajectory between a radiation source emitting the radiation during the first view and a predefined location on a first detector cell, identifying a first intersection between the first trajectory and the surface, and mapping a first portion of the volumetric data, yielded from the first detector cell and corresponding to the first view, to the first intersection. The method also comprises, for a second view, determining a second trajectory between the radiation source during the second view and the predefined location on the first detector cell, identifying a second intersection between the second trajectory and the surface, and mapping a second portion of the volumetric data, yielded from the first detector cell and corresponding to the second view, to the second intersection. The method further comprises generating a projection image based upon the mapping a first portion and the mapping a second portion.

According to another aspect, a method is provided. The method comprises extracting, from volumetric data yielded from an examination of an object via radiation, a portion of the volumetric data indicative of a slice of the object that is of interest. The method also comprise defining a surface about which a sliced projection image of the slice is focused and mapping a first portion of the portion of the volumetric data, corresponding to a first view, to the surface. The method further comprises mapping a second portion of the portion of the volumetric data, corresponding to a second view, to the surface and generating the sliced projection image based upon the mapping a first portion and the mapping a second portion.

Those of ordinary skill in the art may appreciate still other aspects of the present application upon reading and understanding the appended description.

BRIEF DESCRIPTION OF THE DRAWINGS

The application is illustrated by way of example and not limitation in the figures of the accompanying drawings, in which like references generally indicate like elements and in which.

DETAILED DESCRIPTION

Figure 1:
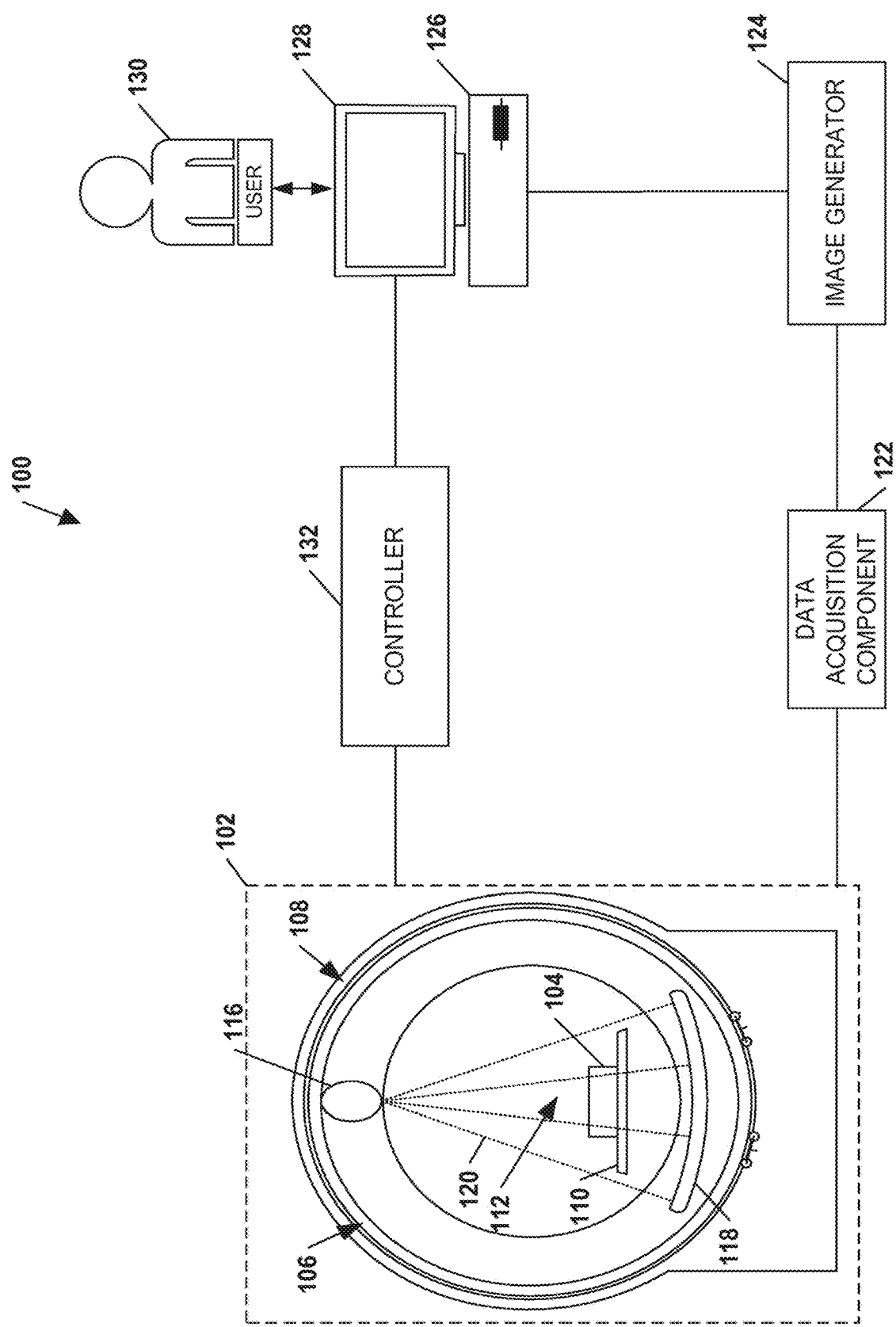
FIG. 1 is a schematic block diagram illustrating an example environment where a CT system such as described herein may be implemented.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to a computed tomography (CT) system, such as may be employed in security applications for threat-detection. The CT system is configured to generate volumetric data, indicative of an object under examination, from which 2D projection images and/or 3D volumetric images of the object can be generated. The projection images may represent an entire object or merely a slice of the object. A projection image representative of merely a slice of the object may be referred to, at times, as a sliced projection image. In some embodiments, projection images resulting from the examination of an object are of a higher resolution than conventionally attainable via CT systems. For example, the CT system may be configured to generate projection images having a spatial frequency of at least 2.5 line pairs per centimeter (2.5 LP/cm).

As provided for herein, an object to be examined by the CT system is inserted into the CT system and is helically examined (e.g., by rotating a radiation source and detector array in an x, y plane about an axis of rotation extending in a z-direction while translating the object in the z-direction) and/or examined in a step-and-shoot manner (e.g., where the object is translated in the z-direction between examinations by the radiation source and detector array). In this way, the object is viewed from a plurality of view-angles to generate volumetric data indicative of the object.

To generate the projection image from the volumetric data, a surface is defined. The surface describes a topological manifold about which the projection image is focused. Thus, aspects of the object contacting the surface may be in-focus in the projection image while aspects of the object more distant from the surface may appear out of focus (e.g., may appear more blurry and/or jagged). In some embodiments, the surface extends (e.g., to some degree) in a direction parallel to the axis of rotation (e.g., extending in the z-direction).

The surface may be arbitrarily defined or may be defined based upon information known about the object. By way of example, using an automated threat detection system, a region of interest (e.g., gun, sheet explosive, etc.) within the object may be identified, and a surface may be defined based upon the region of interest (e.g., to at least partially include the region of interest). The surface may be statically defined for respective objects undergoing examination or may be dynamically defined on an object-by-object or aspect-by-aspect basis, for example. Moreover, in some embodiments, multiple projection images representing a same object may be generated by defining multiple surfaces. In some embodiments, respective projection images may represent a slice of the object (e.g., where a first projection image represents a first slice and a second projection image represents a second slice different than the first slice).

Data corresponding to rays emitted over a defined set of view-angles may be mapped to the surface to generate a projection image focused on the surface. To perform the mapping, the trajectory of rays emitted over a defined set of view-angles and intersecting the detector array at predefined locations is determined. By way of example, in some embodiments, the detector array is comprised of a plurality of detector cells (e.g., typically arranged in rows and columns). For a first view-angle of the defined set of view-angles, a first trajectory from the radiation source to a center of a first detector cell is determined to identify a first ray (e.g., following the first trajectory) and a second trajectory from the radiation source to a center of a second detector cell is determined to identify a second ray (e.g., following the second trajectory). Such a process may be repeated for respective detector cells (e.g., such that there is a one-to-one ratio between detector cells and trajectories for the first view-angle).

Next, the intersection of the surface and respective rays identified from the first view-angle are determined to map data associated with the first view-angle to the surface. By way of example, first data corresponding to the first view and yielded from the first detector cell is mapped to a first point where the first ray intersects the surface and second data corresponding to the first view and yielded from the second detector cell is mapped to a second point where the second ray intersects the surface.

A similar process of mapping the data to the surface may be performed for a defined number of view-angles. For example, for a second view-angle of the defined set of view-angles, a third trajectory from the radiation source to the center of the first detector cell is determined to identify a third ray (e.g., following the third trajectory) and a fourth trajectory from the radiation source to the center of the second detector cell is determined to identify a fourth ray (e.g., following the fourth trajectory). Third data corresponding to the second view and yielded from the first detector cell is mapped to a third point where the third ray intersects the surface and fourth data corresponding to the second view and yielded from the second detector cell is mapped to a fourth point where the fourth ray intersects the surface.

Such mapping facilitates the generation of the projection image. By way of example, an intensity of a first pixel of the projection image representing the first point may be based upon the first data and an intensity of a second pixel of the projection image representing the second point may be based upon the second data. Data for regions of the surface not intersecting a ray may be estimated using one or more interpolation techniques.

Referring to FIG. 1, an example environment 100 of a CT system as provided for herein is illustrated. It may be appreciated that the environment 100 merely provides an example arrangement and is not intended to be interpreted in a limiting manner, such as necessarily specifying the location, inclusion, and/or relative position of the components depicted therein. By way of example, in some embodiments, a data acquisition component 122 is part of a detector array 118 and/or is located on a rotating gantry 106 of the CT system.

In the example environment 100, an examination unit 102 of the radiation system is configured to examine objects 104. The examination unit 102 comprises a rotating gantry 106 and a (stationary) support structure 108 (e.g., which may encase and/or surround at least a portion of the rotating gantry 106 (e.g., as illustrated with an outer, stationary ring, surrounding an outside edge of an inner, rotating ring)). During an examination of an object 104, the object 104 is placed on a support article 110, such as a bed or conveyor belt, for example, that is translated through an examination region 112 (e.g., a hollow bore in the rotating gantry 106), where the object 104 is exposed to radiation 120.

The rotating gantry 106 may surround a portion of the examination region 112 and may comprise a radiation source 116 (e.g., an ionizing radiation source such as an x-ray source and/or gamma-ray source) and the detector array 118. The detector array 118 is typically mounted on a substantially diametrically opposite side of the rotating gantry 106 relative to the radiation source 116, and during an examination of the object 104, the rotating gantry 106 (e.g., including the radiation source 116 and detector array 118) is rotated about the object 104. As will be further described with respect to FIG. 2, such rotation of the rotating gantry 106 in combination with the translation of the object 104 through the examination region 112 causes the object to be helically examined (e.g., in a continuous or step-and-shoot fashion). Because the radiation source 116 and the detector array 118 are mounted to a same rotating gantry 106, a relative position between the detector array 118 and the radiation source 116 is substantially maintained during the rotation of the rotating gantry 106.

During the examination of the object 104, the radiation source 116 emits cone-beam and/or fan-beam radiation configurations from a focal spot of the radiation source 116 (e.g., a region within the radiation source 116 from which radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multiple energy spectrums depending upon, among other things, whether the CT system is configured as a single-energy CT system or a multi-energy (e.g., dual-energy) CT system.

As the emitted radiation 120 traverses the object 104, the radiation 120 may be attenuated differently by different aspects of the object 104. Because different aspects attenuate different percentages of the radiation 120, the number of photons detected by the respective detector cells of the detector array 118 may vary. For example, more dense aspects of the object(s) 104, such as a bone or metal plate, may attenuate more of the radiation 120 (e.g., causing fewer photons to impinge upon a region of the detector array 118 shadowed by the more dense aspects) than less dense aspects, such as skin or clothing.

Radiation detected by the detector array 118 may be directly converted and/or indirectly converted into analog signals that can be transmitted from the detector array 118 to the data acquisition component 122 operably coupled to the detector array 118. The analog signal(s) may carry information indicative of the radiation detected by the detector array 118 (e.g., such as an amount of charge measured over a sampling period and/or an energy level of detected radiation). The data acquisition component 122 is configured to convert the analog signals output by the detector array 118 into digital signals and/or to compile signals that were transmitted within a predetermined time interval, or measurement interval, using various techniques (e.g., integration, photon counting, etc.). The compiled signals are typically in projection space and are, at times, referred to as projections. A projection may be representative of the information collected or measurements acquired by respective detector cells of the detector array 118 during a one time-interval or view, where a view corresponds to data collected while the radiation source 116 was at a particular view-angle relative to the object 104.

The projections generated by the data acquisition component 122 may be transmitted to an object analysis component (not shown) configured to assemble two or more projections to generate a volumetric representation of the object 104 in projection space and/or in image space (e.g., where the projections are converted to image space by reconstructing the projections via analytic, iterative, or other reconstruction techniques (e.g., tomosynthesis reconstruction, backprojection, etc.)). In this way, volumetric data indicative of the object 104 is yielded from the examination.

In some embodiments, the object analysis component (not shown) is further configured to utilize the volumetric data (e.g., in projection space and/or image space) to determine or estimate one or more properties of items within the object 104. By way of example, in a security environment, the object analysis component (e.g., at times referred to as an automated threat detection system) may be configured to approximate, among other things, density information, z-effective information, and/or shape characteristics of various items within the object (e.g., a suitcase, bag, etc.). Using such information and/or characteristics, the object analysis component may determine if the object 104 comprises a potential threat item (e.g., such as a weapon and/or explosive), which may be flagged for further inspection. For example, the object analysis component may compare the approximated densities or other properties of respective items to a list of known properties for threat items. If one or more of the approximated densities corresponds to (e.g., matches within a specified deviation) a density on the list, the object analysis component may alert security personnel of the correspondence and/or alert an image generator of the potential identification, for example.

The example CT system further comprises an image generator 124 configured to generate one or more projection images of the object 104 using the projections yielded from the data acquisition component 122 and/or information provided by the object analysis component.

As will be described in more detail below, to generate a projection image, a surface is defined about which the projection image is to be focused. The surface may be planar or non-planar and, in some embodiments, extends (e.g., to some degree) in a direction parallel to the axis of rotation. Moreover, the surface may be user-defined or may be defined as a function of information provided by the object analysis component. By way of example, in some embodiments, the image generator 124 may define a surface to include a portion of the object 104 identified as a potential threat item by the object analysis component.

Figure 4:
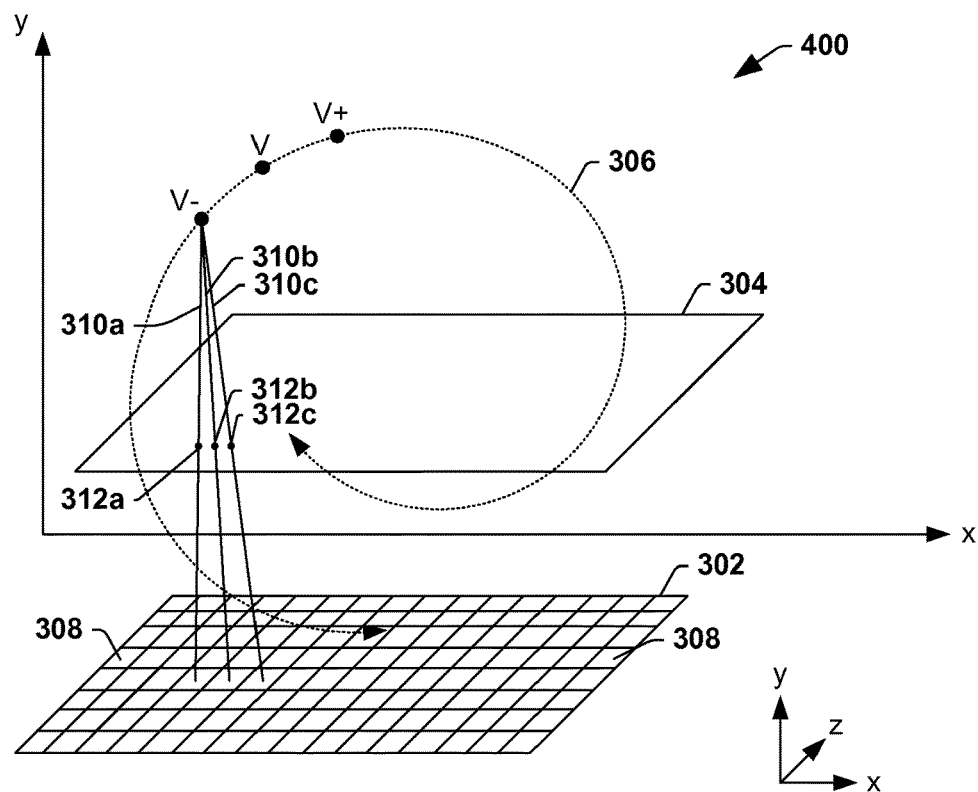
FIG. 4 is a functional diagram illustrating an example mapping for a first view.
Figure 5:
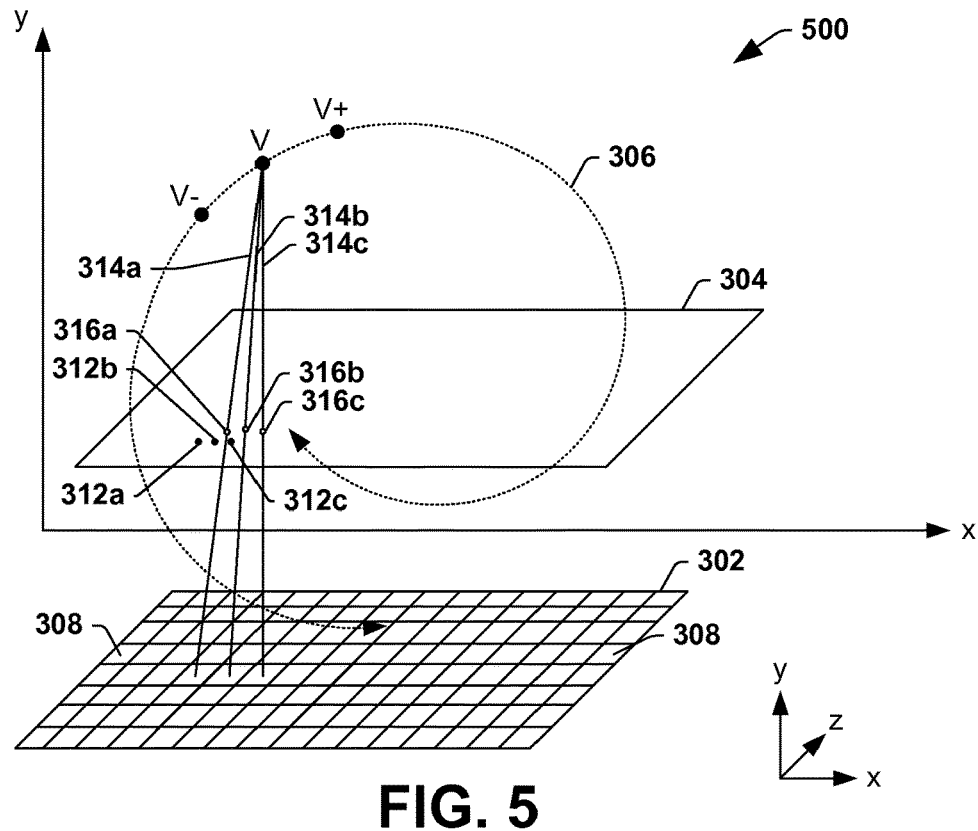
FIG. 5 is a functional diagram illustrating an example mapping for a first view.
Figure 6:
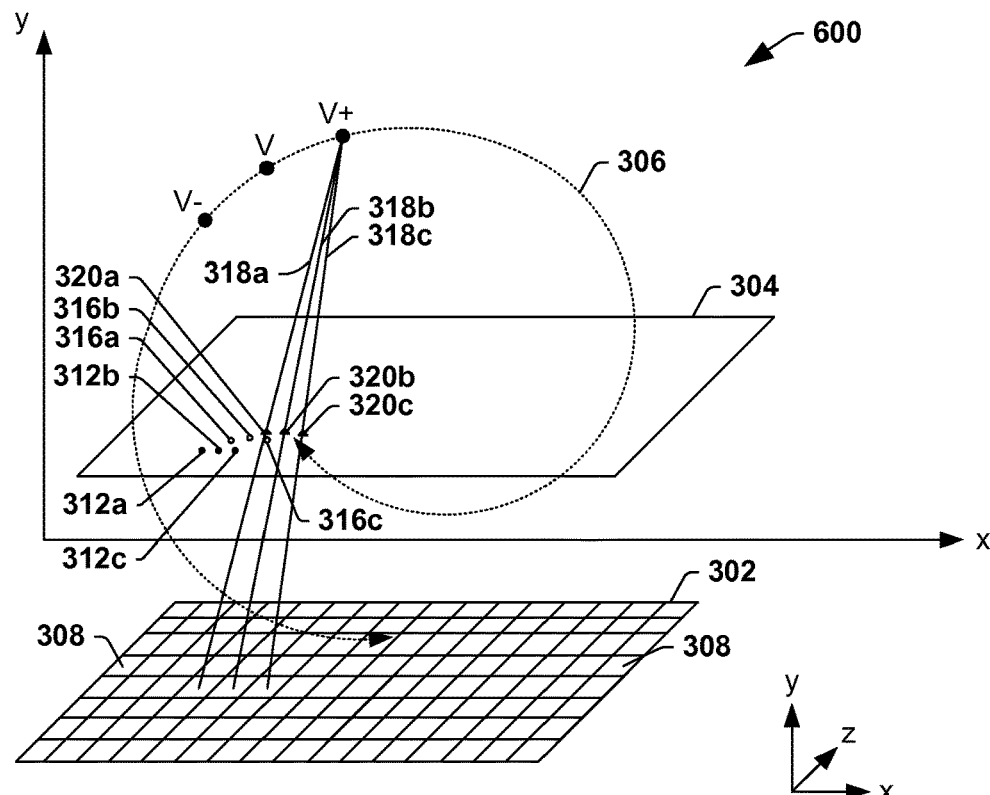
FIG. 6 is a functional diagram illustrating an example mapping for a first view.

In some embodiments, as further described by FIGS. 4-6, data yielded from a plurality of views (e.g., corresponding to the radiation source at a plurality of view-angles) is mapped to the surface and the projection image is generated based upon the mapping. By way of example, first data yielded from a first detector cell during a first view may be mapped to a first point on the surface (e.g., based upon a trajectory of a first ray intersecting a center of the first detector cell during the first view) and a characteristic of a first pixel representing the first point may be determined based upon the first data. As another example, second data yielded from the first detector cell during a second view may be mapped to a second point on the surface (e.g., based upon a trajectory of a second ray intersecting the center of the first detector cell during the second view) and a characteristic of a second pixel representing the second point may be determined based upon the second data. In this way, the image generator 124 uses data acquired during a plurality of views to generate the projection image, for example.

The example environment 100 further comprises a terminal 126, or workstation (e.g., a computer), that may be configured to receive a projection image(s) indicative of the object 104 (e.g., output by the image generator 124) and/or to receive information related to whether the object 104 comprises an item of potential interest, for example (e.g., output from the object analysis component). At least some of the received information/images may be provided by the terminal 126 for display on a monitor 128 to a user 130 (e.g., security personnel, medical personnel, etc.). In this way, the user 130 can inspect the image(s) to identify areas of interest within the object 104 while also being provided information regarding potential items of interest that have been identified via an automated process, for example. The terminal 126 can also be configured to receive user input that can direct operations of the examination unit 102 (e.g., a speed to rotate, a speed and direction of a support article 110, etc.), for example.

In the example environment 100, a controller 132 is operably coupled to the terminal 126. The controller 132 may be configured to control operations of the examination unit 102, for example. By way of example, in one embodiment, the controller 132 may be configured to receive information from the terminal 126 and to issue instructions to the examination unit 102 indicative of the received information (e.g., adjust a speed of a conveyor belt).

Figure 2:
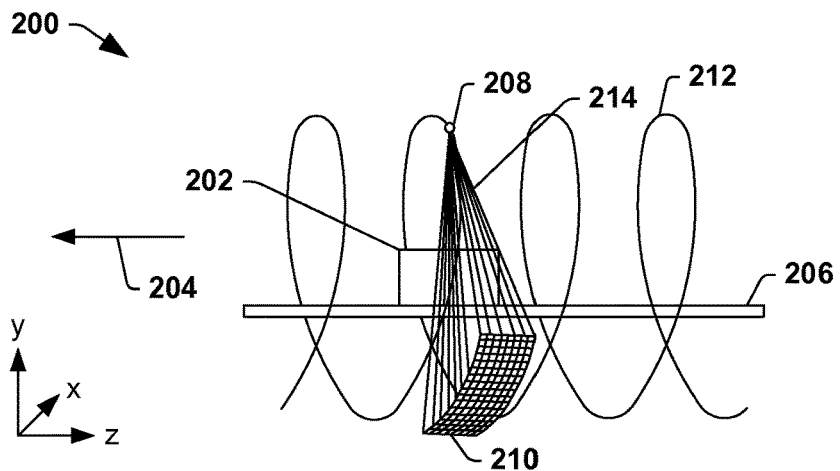
FIG. 2 is a functional diagram illustrating a helical examination performed via a CT system.

FIG. 2 is a functional diagram 200 of a helical examination performed via a CT system, such as in security applications and/or medical applications, for example. In such a system, an object 202 (e.g., 104 in FIG. 1) under examination is translated 204 in a direction substantially parallel to an axis of rotation (e.g., along a z-axis), via a support article 206 (e.g., 110 in FIG. 1). The object 202 is exposed to radiation 214 (e.g., 120 in FIG. 1) while the object 202 is being translated. That is, one or more radiation sources 208 (e.g., 116 in FIG. 1) are configured to emit radiation 214, causing the object 202 to be exposed to radiation 214. A detector array 210 (e.g., 118 in FIG. 1), mounted on a substantially diametrically opposite side of the object 202 relative to the radiation source(s) 208, is configured to detect radiation 214 that has traversed the object 202. In this way, by emitting and detecting radiation 214, the object 202 is examined.

In a CT system, the radiation source(s) 208 and the detector array 210 are typically rotated about the object 202 in a plane (e.g., typically defined as an x-y plane) via a rotating gantry (e.g., 106 in FIG. 1) during the examination. In this way, the radiation source 208 views the object 202 from a plurality of view-angles to develop volumetric data regarding the object 202. Further, in an environment where the object 202 is translated in the z-direction (e.g., continuously or in a step-and-shoot manner), such a rotation may cause the radiation source(s) 208 and/or the detector array 210 to follow a spiral or helical-like trajectory 212 relative to the object (e.g., where the radiation source(s) 208 and detector array 210 do not move in the z-direction, and thus the helical trajectory is established by the combination of the x, y rotation of the radiation source(s) 208 and detector array 210 and the z-direction translation 204 of the object 202).

Figure 3:
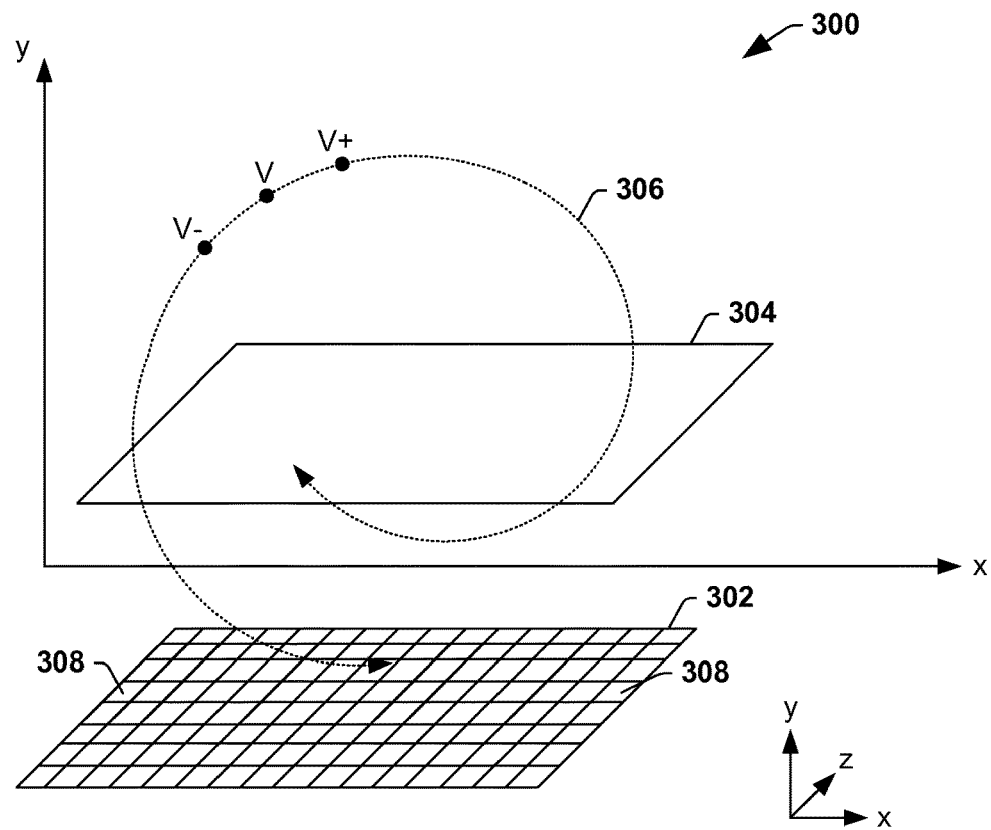
FIG. 3 is a functional diagram illustrating a helical examination performed via a CT system.

FIG. 3 illustrates another functional diagram 300 further describing the trajectory of a radiation source (e.g., 208 in FIG. 2) and a detector array 302 (e.g., 210 in FIG. 2). The detector array 302 and radiation source rotate in an x, y plane about an object under examination while an object (e.g., 104 in FIG. 1) is translated in a z-direction (e.g., perpendicular to the x, y plane), causing the radiation source and the detector array 302 to follow a helical-like trajectory 306 relative to the object. For purposes of illustration, merely a surface 304 of interest within the object is illustrated. It may be appreciated that while FIG. 3 describes a surface 304 within the object, in some embodiments, the surface about which the projection image is focused may not be located within an object. For example, the surface 304 may be located in a region typically occupied by the support article (e.g., 110 in FIG. 1).

The black dots along the helical-like trajectory 306 represent the radiation source at various times during the examination and correspond to different view-angles. For example, V− may represent the radiation source at a first view-angle, V may represent the radiation source at a second view-angle, and V+ may represent the radiation source at a third view-angle. Data generated while the radiation source is at the first view-angle may be compiled into a first view, data generated while the radiation source is at the second view-angle may be compiled into a second view, etc. The number of views (e.g., and thus the number of view-angles) may be based upon the sampling frequency of the detector cells and/or a desired signal-to-noise ratio of the CT system, for example.

In this diagram 300, the detector array 302 (e.g., 210 in FIG. 2) is illustrated as being planar. However, it may be appreciated that in some embodiments, a detector array of a CT system is substantially arcuate in shape as illustrated in FIGS. 1 and 2.

A detection surface of the detector array 302 generally extends in the x-direction and the z-direction, where the z-direction is typically a direction in which the object is translated. The detector array 302 generally comprises detector cells 308 arranged in columns and rows. A row of detectors cells 308 generally extends in the x-direction and a column of detector cells 308 generally extends in the z-direction. Typically, a distance that the object is translated between two adjacent views is less than the row pitch (e.g., where row pitch is defined as the distance from a center of a first row to a center of an adjacent row). By way of example, in some embodiments, the distance that the object is translated between two adjacent views is approximately 5% of the row pitch. Accordingly, a point in the object shadows a same row of detector cells for approximately 20 views. It is to be appreciated, however, that this is merely a non-limiting example.

During respective views, all or substantially all of the detector array 302 is illuminated by the radiation. For example, the radiation source may continually or intermittently emit cone-beam radiation that exposes nearly all of the detector array 302 to radiation.

Turning to FIGS. 4-6, functional diagrams 400, 500, and 600 illustrate how data yielded from the detector array 302 is mapped to the surface 304 (e.g., by the image generator 124 in FIG. 1) to facilitate the generation of a projection image focused on the surface 304. In some embodiments, the surface 304 extends in a direction parallel to the axis of rotation (e.g., parallel to a z-axis) and lies within an x, z plane. In other embodiments, the surface 304 may be non-planar and/or may lie within a different plane (e.g., such as a y, z plane). In some embodiments, the surface 304 lies within an object under examination. In other embodiments, the surface 304 may not lie within the object. For example, the surface 304 may be spatially coincident with a support article (e.g., 110 in FIG. 1) translating the object.

In some embodiments, a set of views of interest (e.g., and thus the corresponding view-angles of interests) are defined based upon the orientation of the surface 304. By way of example, a first set of views may be of interest when the surface lies within an x, z plane and a second set of views (e.g., different than the first set of views) may be of interest when the surface lies within a y, z plane. Moreover, a number of views of interest may be predefined (e.g., at time of manufacturing), may be selected at random, and/or may be selected based upon some predetermined criteria (e.g., voltage applied to the radiation source, orientation of the surface, speed of rotation, speed of translation, desired resolution, etc.).

For respective views of the set of views, data associated with the view is mapped to the surface 304. By way of example, referring to FIG. 4, a functional diagram 400 describing an example mapping for a first view is illustrated. During the first view, the radiation source is assumed to be positioned at a first view-angle V−. It may be appreciated that in practice, due to the continuous rotation of the radiation source, the first view may correspond to a first range of view-angles. However, for purposes of the calculation, the radiation source is assumed to be positioned at the first view-angle during the first view (e.g., which may be a center of the range).

To map the data associated with the first view to the surface 304, the trajectories of one or more rays impinging predefined locations on detector array 302 are determined. By way of example, the trajectory of a first ray 310a, emitted from the radiation source while at the first view-angle V−, to a center of a first detector cell is determined to identify a first location 312a where the first ray 310a intersected the surface 304. As another example, the trajectory of a second ray 310b, emitted from the radiation source while at the first view-angle V−, to a center of a second detector cell is determined to identify a second location 312b where the second ray 310b intersected the surface 304. As yet another example, the trajectory of a third ray 310c, emitted from the radiation source while at the first view-angle V−, to a center of a third detector cell is determined to identify a third location 312c where the third ray 310c intersected the surface 304. Determining such trajectories may be repeated for a plurality of detector cells, such as respective detector cells 308 of the detector array 302.

Data yielded from respective detector cells 308 during the first view is mapped to the identified locations where the rays 310 intersected the surface 304. By way of example, data yielded from the first detector cell during the first view is mapped to the first location 312a, and data yielded from the second detector cell during the first view is mapped to the second location 312b. Data yielded from the third detector cell during the first view is mapped to the third location 312c. Such mapping may be repeated for the plurality of detector cells, for example.

A similar process may be performed for a second view and a third view. By way of example, referring to FIG. 5, a functional diagram 500 describing an example mapping for a second view is illustrated. During the second view, the radiation source is assumed to be positioned at a second view-angle V.

To map the data associated with the second view to the surface 304, the trajectory of one or more rays impinging the predefined locations on detector array 302 are determined. By way of example, the trajectory of a fourth ray 314a, emitted from the radiation source while at the second view-angle V, to a center of the first detector cell is determined to identify a fourth location 316a where the fourth ray 314a intersected the surface 304. As another example, the trajectory of a fifth ray 314b, emitted from the radiation source while at the second view-angle V, to a center of the second detector cell is determined to identify a fifth location 316b where the fifth ray 314b intersected the surface 304. As yet another example, the trajectory of a sixth ray 314c, emitted from the radiation source while at the second view-angle V, to a center of the third detector cell is determined to identify a sixth location 316c where the sixth ray 314c intersected the surface 304. Determining such trajectories may be repeated for the plurality of detector cells.

It may be appreciated that for ease of understanding, solid dots representing the locations 312a-312c where the first, second and third rays 310a-310c intersected the surface 304 have been imposed on the surface 304 in FIG. 5 to illustrate a change in locations between the first and second views.

Data yielded from respective detector cells 308 during the second view is mapped to the identified locations where the rays 314 intersected the surface 304. By way of example, data yielded from the first detector cell during the second view is mapped to the fourth location 316a, and data yielded from the second detector cell during the second view is mapped to the fifth location 316b. Data yielded from the third detector cell during the second view is mapped to the sixth location 316c. Such mapping may be repeated for the plurality of detector cells, for example.

Referring to FIG. 6, a functional diagram 600 describing an example mapping for a third view is illustrated. During the third view, the radiation source is assumed to be positioned at a third view-angle V+.

To map the data associated with the third view to the surface 304, the trajectory of one or more rays impinging the predefined locations on detector array 302 are determined. By way of example, the trajectory of a seventh ray 318a, emitted from the radiation source while at the third view-angle V+, to a center of the first detector cell is determined to identify a seventh location 320a where the seventh ray 318a intersected the surface 304. As another example, the trajectory of an eighth ray 318b, emitted from the radiation source while at the third view-angle V+, to a center of the second detector cell is determined to identify a eighth location 320b where the eighth ray 318b intersected the surface 304. As yet another example, the trajectory of a ninth ray 318c, emitted from the radiation source while at the third view-angle V+, to a center of the third detector cell is determined to identify a ninth location 320c where the ninth ray 318c intersected the surface 304. Determining such trajectories may be repeated for the plurality of detector cells.

It may be appreciated that for ease of understanding, solid dots representing the locations 312a-312c where the first, second, and third rays 310a-310c intersected the surface 304 and hollow dots representing the locations 316a-316c where the fourth, fifth, and sixth rays 314a-314c intersected the surface 304 have been imposed on the surface 304 in FIG. 6 to illustrate changes in locations between the first, second, and third views.

Data yielded from respective detector cells 308 during the third view is mapped to the identified locations where the rays 318 intersected the surface 304. By way of example, data yielded from the first detector cell during the third view is mapped to the seventh location 320a, and data yielded from the second detector cell during the third view is mapped to the eighth location 320b. Data yielded from the third detector cell during the third view is mapped to the ninth location 320c. Such mapping may be repeated for the plurality of detector cells, for example.

It may be appreciated that while the example functional diagrams 400, 500, and 600 illustrate the mappings of merely three detector cells over three views (e.g., to derive data for nine locations on the surface), the number of detectors cells that are mapped to the surface and/or the number of views being mapped may be substantially greater, such that data is available for a majority of the surface (e.g., dots cover a substantial majority of the surface).

Figure 7:
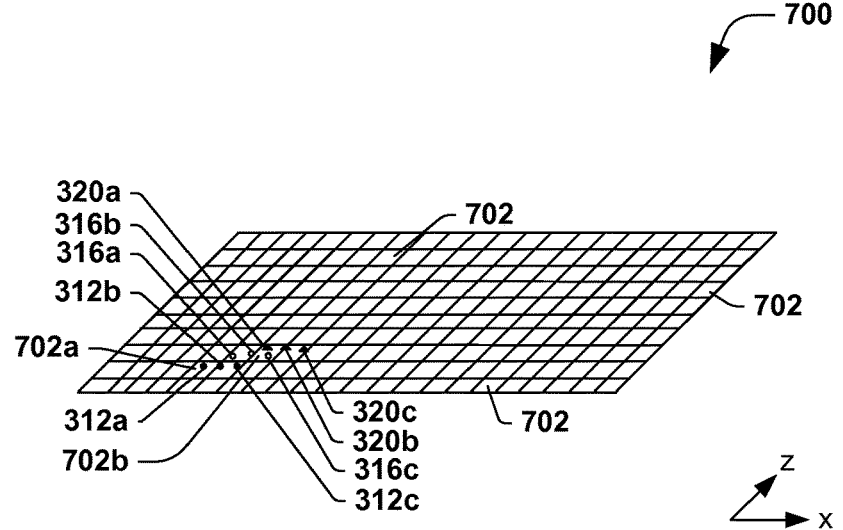
FIG. 7 is an example projection image having data from a plurality of views mapped thereto.

It may be appreciated that when developing the projection image from the data based upon the mappings described above, a characteristic(s) of a pixel of the projection image may be based upon the data mapped to a region of the surface represented by the pixel. For example, referring to FIG. 7, an example projection image 700 depicting the surface 304 is illustrated. The projection image 700 comprises a grid of pixels 702, wherein respective pixels 702 represent a region of the surface 304.

Based upon, among other things, the size of the object, a width of the detector array relative to a width of the object, a desired resolution, a rotational speed of the rotating gantry, a translational speed of the object, a number of views that are mapped to the surface, etc., pixels 702 of the projection image 700 may correspond to a region of the surface to which no data has been mapped, may correspond to a region of the surface to which little data has been mapped (e.g., merely one of the identified rays intersect the surface within the region represented by the pixel), or may respond to a region of the surface to which a plurality of data has been mapped (e.g., two or more identified rays intersect the surface within the region represented by the pixel).

As an example, a first pixel 702a may represent a region of the surface to which merely a limited amount of data has been mapped. That is, the first pixel 702a may represent a region of the surface intersected by merely one of the identified ray (e.g., at the first location 312a). Accordingly, one or more characteristics of the first pixel 702a, such as hue, saturation, intensity, etc., may be determined based upon the limited amount of data (e.g., the data generated by a first detector cell during a first view).

Other pixels may represent a region of the surface to which a greater amount of data has been mapped. By way of example, a second pixel 702b may represent a region of the surface intersected by a first set of identified rays (e.g., at the sixth location 316c and the seventh location 320a). Accordingly, one or more characteristics of the second pixel 702b may be determined based upon the data corresponding to one or more of the first set of identified rays. By way of example, data generated by the third detector cell during the second view and data generated by the first detector cell during the third view may be summed, averaged, or otherwise compiled to determine one or more characteristics of the second pixel 702b. As another example, merely the data generated by the third detector cell during the second view or the data generated by the first detector cell during the third view may be used to determine one or more characteristics of the second pixel 702b. In still other embodiments, kernel based interpolation techniques and/or other interpolation techniques can be used to interpolate the available data (e.g., corresponding to a region of the surface represented by the pixel) and/or to determine one or more characteristics of the first pixel 702a, the second pixel 702b, and a third pixel.

Still other pixels may represent a region of the surface to which no data has been mapped (e.g., none of the identified rays intersect a region of the surface represented by a third pixel). In situations where little to no data is available for a region of the surface, for example, one or more interpolation techniques may be performed on the data mapped to the surface to estimate data for a region to which little to no data has been mapped. By way of example, a kernel based interpolation can be performed where data corresponding to locations in a neighborhood of the empty region is weighted based upon the proximity of the location to the empty region and a weighted average is computed using the weighted data. As another example, data corresponding to locations in a neighborhood of the empty region is averaged (e.g., without weights) to estimate data for the region to which little to no data has been mapped. As still another example, a nearest neighbor approach may be taken, where data for a region to which little to no data has been mapped is estimated based upon a nearest location to which data has been mapped. In this way, one or more characteristics for a pixel representing a region for which little to no data is available is determined based upon data corresponding to a different region of the surface represented by one or more pixels adjacent the pixel.

Figure 8:
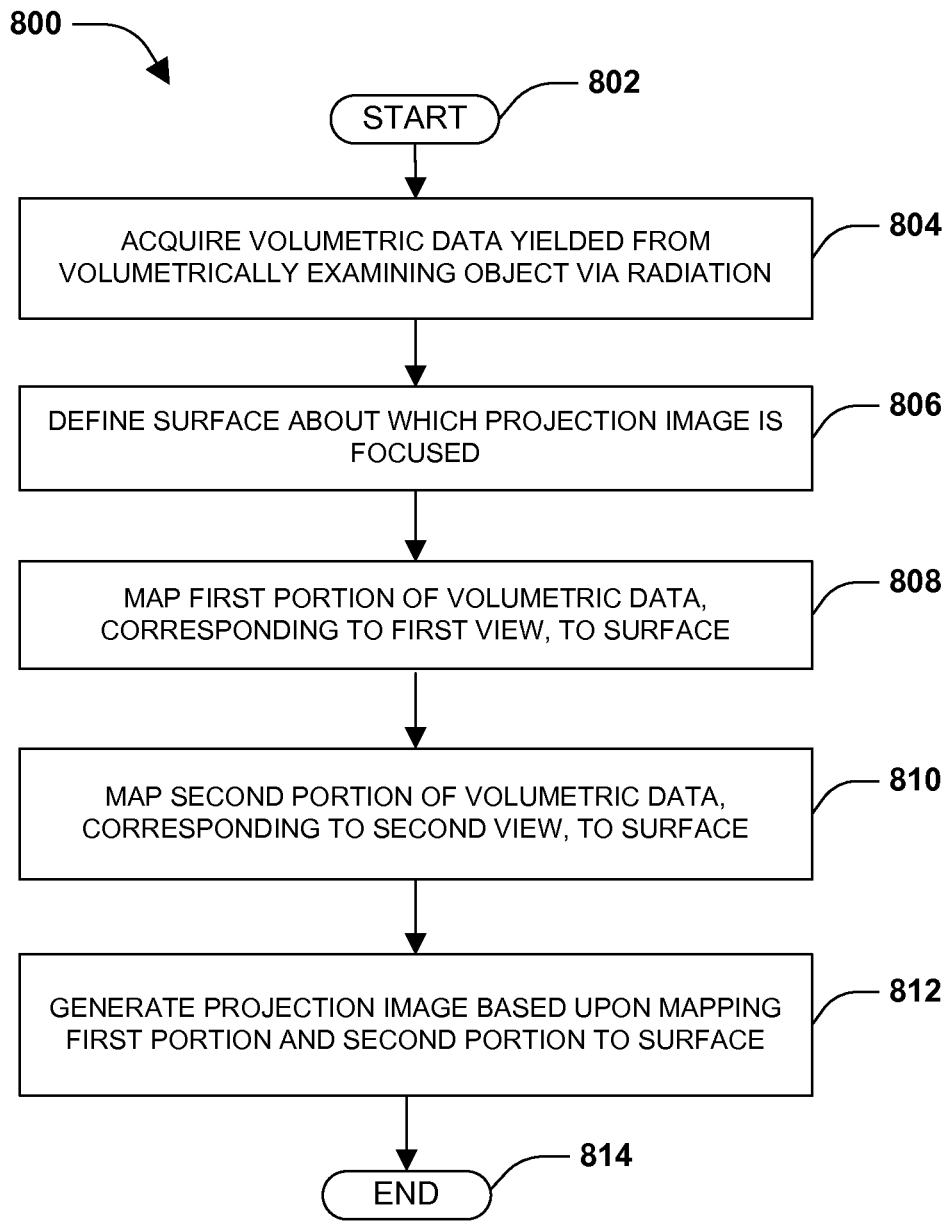
FIG. 8 is a flow diagram illustrating an example method for generating a projection image from volumetric data.

Referring to FIG. 8, an example method 800 for generating a projection image from volumetric data is illustrated. The example method 800 begins at 802, and volumetric data of an object is acquired at 804. The volumetric data (e.g., in projection space) is yielded from volumetrically examining an object via radiation. Such an examination may comprise emitting fan-beam or cone-beam radiation from a radiation source whose position is varied relative to the object to cause the object to be examined from a plurality of view-angles. In some embodiments, the object may be substantially stationary during the examination. In other embodiments, the object may be substantially continuously translated (e.g., in a z-direction) during an examination while the radiation source is rotated in a plane (e.g., extending in the x and y directions). In still other embodiments, the object may be periodically and/or intermittently translated during the examination, such as according to a step-and-shoot-approach. In this way, by volumetrically examining the object via radiation, volumetric data is generated regarding the object.

At 806 a surface about which the projection image is to be focused is defined. The surface describes a topological manifold, which may be planar or non-planar. The surface may be defined by a user (e.g., based upon visualizing the volumetric data), may be defined based upon identified contents of the object (e.g., such as identified by using an object analysis component that analyzes the volumetric data and/or images resulting therefrom to identify potential items of interest), may be defined at random, and/or may be pre-defined (e.g., such as at the time of manufacturing and/or prior to an examination of the object).

At 808, a first portion of the volumetric data, corresponding to a first view, is mapped to the surface. By way of example, as described with respect to FIG. 4, data yielded from respective detector cells and corresponding to a first view of the object (e.g., when the radiation source was at a first view-angle relative to the object) may be mapped to the surface by computing the intersection of predefined rays with the surface. By way of example, the trajectory of rays impinging a center of respective detector cells may be determined and data yielded from respective detector cells during the first view may be mapped to a location on the surface where the corresponding ray intersected the surface. For example, the trajectory of a first ray impinging a center of a first detector cell may be determined, and data yielded from the first detector cell during the first view may be mapped to a location where the first ray intersected the surface. As another example, the trajectory of a second ray impinging a center of a second detector cell may be determined, and data yielded from the second detector cell during the first view may be mapped to a location where the second ray intersected the surface. It may be appreciated that while reference is made herein to determining the trajectory of rays impinging a center of respective detector cells, other predefined locations on the detector array (e.g., or on respective detector cells) may instead be used. For example, the trajectory of rays impinging a corner of respective detector cells may be computed instead of computing the trajectory of rays impinging a center of respective detector cells.

At 810 in the example method 800, a second portion of the volumetric data, corresponding to a second view, is mapped to the surface. By way of example, as described with respect to FIG. 5, data yielded from respective detector cells and corresponding to a second view of the object (e.g., when the radiation source was at a second view-angle relative to the object) may be mapped to the surface by computing the intersection of predefined rays with the surface. By way of example, the trajectory of rays impinging a center of respective detector cells may be determined and data yielded from respective detector cells during the second view may be mapped to a location on the surface where the corresponding ray intersected the surface. For example, the trajectory of a third ray impinging the center of the first detector cell may be determined, and data yielded from the first detector cell during the second view may be mapped to a location where the third ray intersected the surface. As another example, the trajectory of a fourth ray impinging the center of the second detector cell may be determined, and data yielded from the second detector cell during the second view may be mapped to a location where the second ray intersected the surface.

At 812 in the example method 800, a projection image is generated based upon mapping the first portion of the volumetric data and the second portion of the volumetric data to the surface. For example, one or more characteristics of the respective pixels of the projection image may be determined based upon the mapping as described with respect to FIG. 7.

The example method ends at 814.

Figure 9:
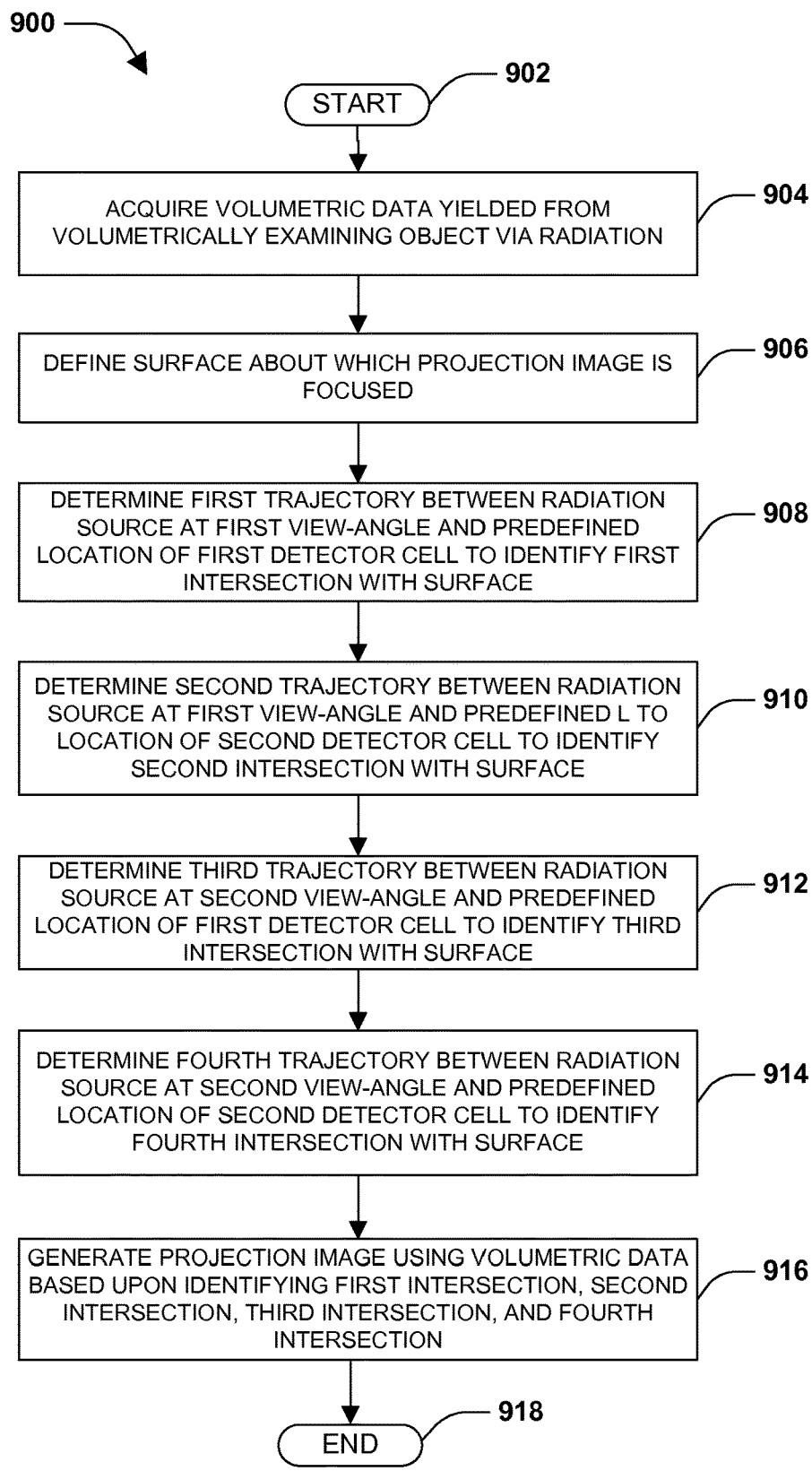
FIG. 9 is a flow diagram illustrating an example method for generating a projection image from volumetric data.

Referring to FIG. 9, another example method 900 for generating a projection image from volumetric data is illustrated. The example method 900 begins at 902, and volumetric data of an object is acquired at 904. In some embodiments, the volumetric data is acquired from a detector array comprising a plurality of detector cells respectively configured to generate information regarding radiation impinging thereon. Thus, a first detector cell generates information regarding radiation that impinges the first detector cell and a second detector cell generates information regarding radiation that impinges the second detector cell.

At 906 a surface about which the projection image is to be focused is defined. The surface describes a topological manifold, which may be planar or non-planar. The surface may be defined by a user (e.g., based upon visualizing the volumetric data), may be defined based upon identified contents of the object (e.g., such as identified by using an object analysis component that analyzes the volumetric data and/or images resulting therefrom to identify potential items of interest), may be defined at random, and/or may be pre-defined (e.g., such as at the time of manufacturing and/or prior to an examination of the object).

At 908, a first trajectory between a radiation source at a first view-angle and a predefined location of a first detector cell is determined to identify a first intersection with the surface. That is, stated differently, a location on the surface where a first ray following the first trajectory would intersect the surface is determined. In this way, data corresponding to the radiation source at the first view-angle and yielded from the first detector cell can be mapped to the location on the surface where the first ray intersected the surface.

At 910, a second trajectory between the radiation source at the first view-angle and a predefined location of a second detector cell is determined to identify a second intersection with the surface. That is, stated differently, a location on the surface where a second ray following the second trajectory would intersect the surface is determined. In this way, data corresponding to the radiation source at the first view-angle and yielded from the second detector cell can be mapped to the location on the surface where the second ray intersected the surface.

At 912, a third trajectory between the radiation source at a second view-angle and the predefined location of the first detector cell is determined to identify a third intersection with the surface. That is, stated differently, a location on the surface where a third ray following the third trajectory would intersect the surface is determined. In this way, data corresponding to the radiation source at the second view-angle and yielded from the first detector cell can be mapped to the location on the surface where the third ray intersected the surface.

At 914, a fourth trajectory between the radiation source at a second view-angle and the predefined location of the second detector cell is determined to identify a fourth intersection with the surface. That is, stated differently, a location on the surface where a fourth ray following the fourth trajectory would intersect the surface is determined. In this way, data corresponding to the radiation source at the second view-angle and yielded from the second detector cell can be mapped to the location on the surface where the fourth ray intersected the surface.

At 916 in the example method 900, a projection image is generated using the volumetric data. The projection image is generated based upon identifying the first intersection, the second intersection, the third intersection, and the fourth intersection. By way of example, a first portion of the volumetric data generated by the first detector cell during a first view (e.g., while the radiation source is at the first view-angle) may be used to determine a characteristic(s) of a first pixel of the projection image representing a portion of the surface comprising the first intersection. As another example, a second portion of the volumetric data generated by the second detector cell during the first view may be used to determine a characteristic(s) of a second pixel of the projection image representing a portion of the surface comprising the second intersection. As yet another example, a third portion of the volumetric data generated by the first detector cell during the second view may be used to determine a characteristic(s) of a third pixel of the projection image representing a portion of the surface comprising the third intersection.

The example method 900 ends at 918.

In some embodiments, a plurality of projection images may be generated for an object by defining multiple surfaces within the object (e.g., where respective projection images are focused on a different surface) and/or by generating sliced projection images which respectively depict a projection of merely a slice of the object.

Figure 10:
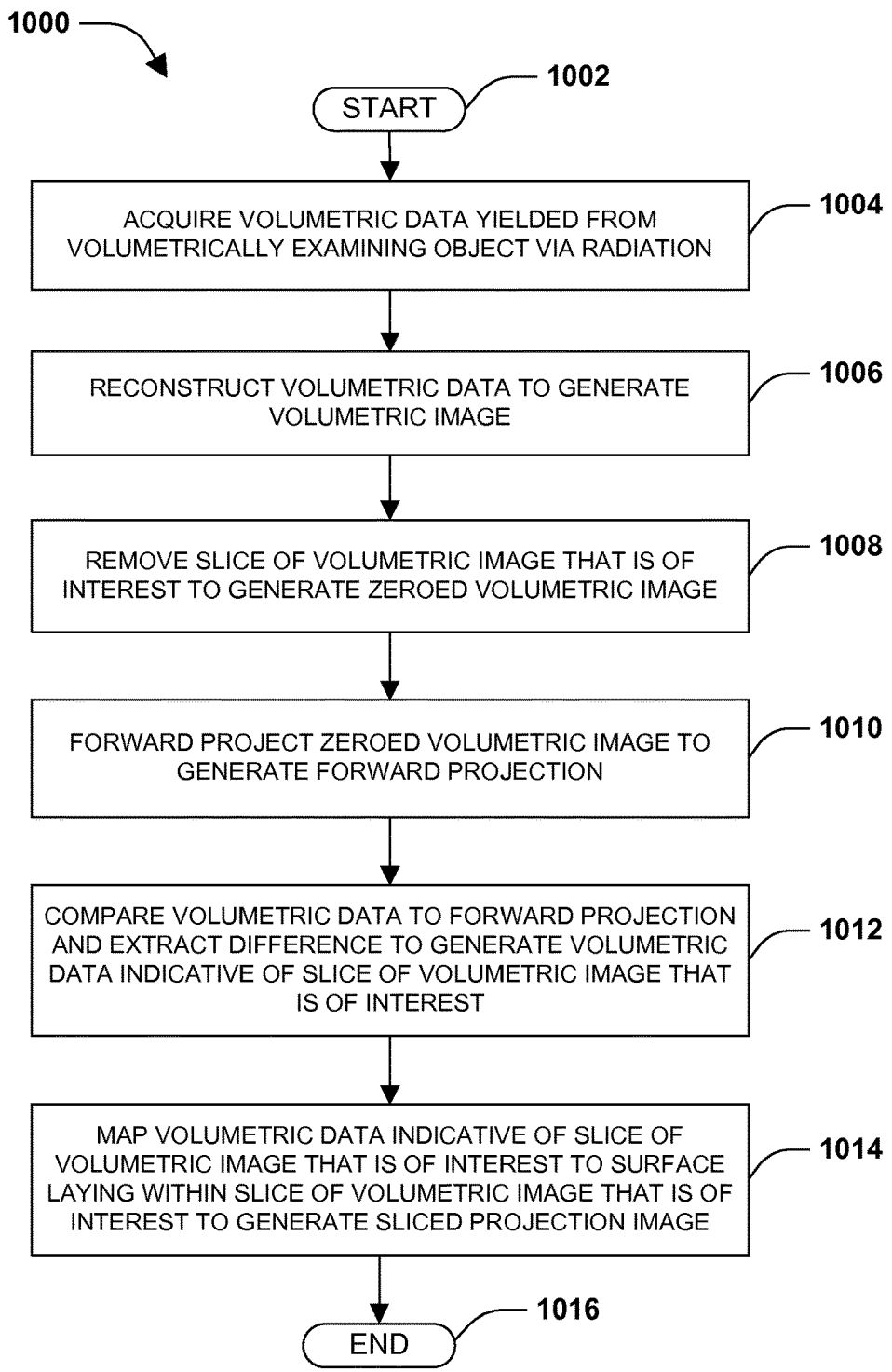
FIG. 10 is a flow diagram illustrating an example method for generating a sliced projection image from volumetric data.

Referring to FIG. 10, an example method 1000 for generating a sliced projection image is described. The example method 1000 begins at 1002, and volumetric data yielded from volumetrically examining an object via radiation is acquired at 1004.

At 1006, the volumetric data is reconstructed (e.g., such as by an object analysis component in FIG. 1) to generate a volumetric image. Example reconstruction techniques include, among other things, back-projection, iterative reconstruction, tomosynthesis reconstruction, and/or other analytical or iterative approaches for converting volumetric data from projection space to image space.

At 1008 in the example method 1000, a slice of the volumetric image that is of interested is removed from the volumetric image to generate a zeroed volumetric image. By way of example, voxels representing a slice of the object that is of interest may be zeroed or otherwise cleared such that the data relating to such voxels is separated from data relating to voxels that do not represent the slice.

At 1010 in the example method 1000, the zeroed volumetric image is forward projected to generate a forward projection. That is, voxels of the volumetric image that were not zeroed are forward projected to generate the forward projection using analytic and/or iterative techniques that convert the zeroed volumetric image from image space to projection space.

At 1012, the volumetric data is compared to the forward projection to identify a portion of the volumetric data representative of the slice of the volumetric image that is of interest. By way of example, the forward projection is subtracted from the volumetric data to identify a difference. Such a difference may be extracted from the volumetric data to generate volumetric data indicative of a slice of the volumetric image that is of interest. In this way, a portion of the volumetric data that is representative of a slice of the object that is of interest may be separated from the remaining volumetric data.

At 1014, the volumetric data indicative of the slice of the volumetric image that is of intersect is mapped to a surface laying within the slice of the volumetric image that is of interest to generate a sliced projection image, such as using one of the foregoing techniques described with respect to FIGS. 3-9.

The example method 1000 ends at 1016.

Figure 11:
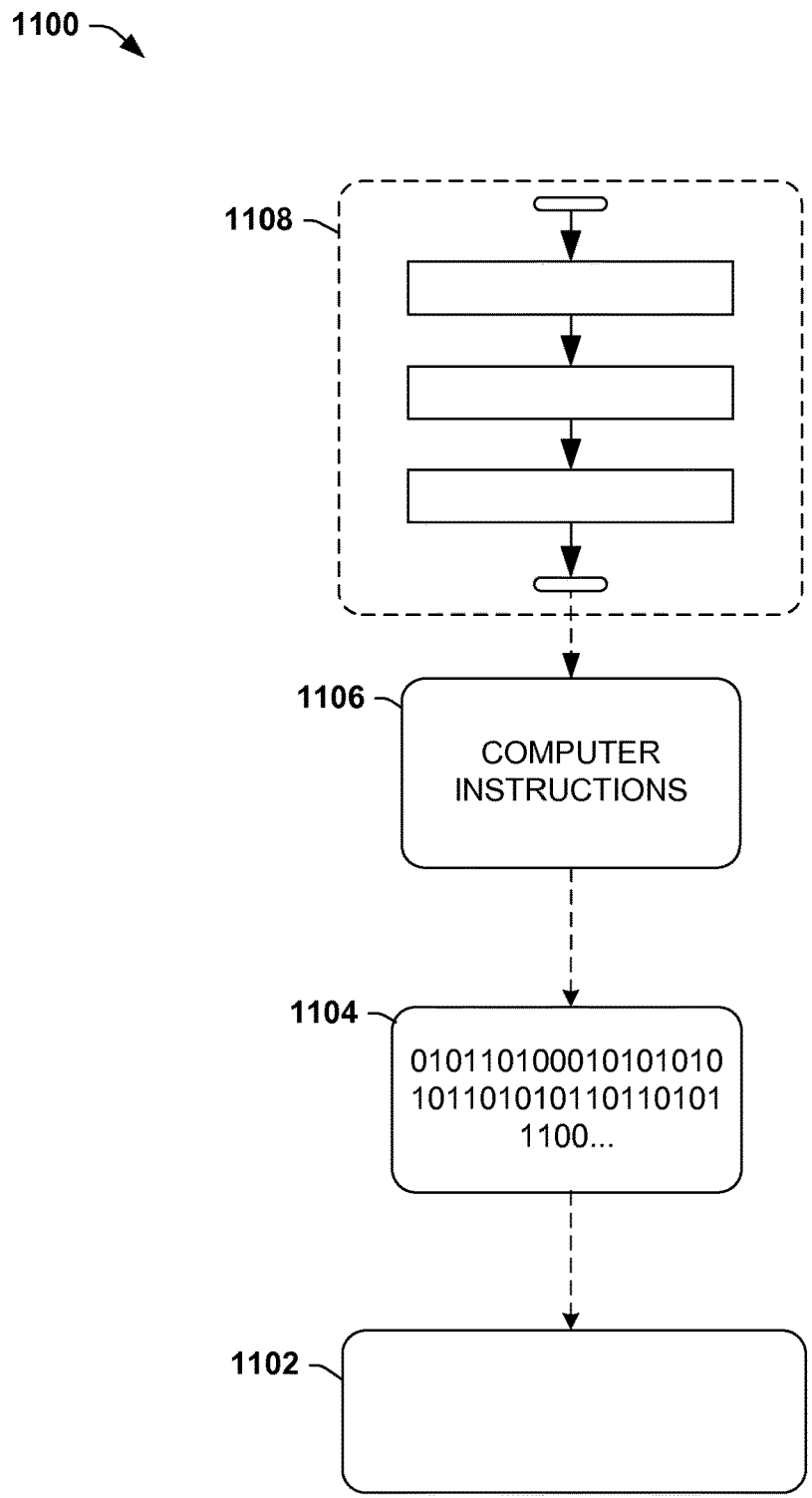
FIG. 11 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 11, wherein the implementation 1100 comprises a computer-readable medium 1102 (e.g., a flash drive, CD-R, DVD-R, application-specific integrated circuit (ASIC), field-programmable gate array (FPGA), a platter of a hard disk drive, etc.), on which is encoded computer-readable data 1104. This computer-readable data 1104 in turn comprises a set of processor-executable instructions 1106 configured to operate according to one or more of the principles set forth herein. In one such embodiment of implementation 1100, the processor-executable instructions 1106 may be configured to perform a method 1108 when executed via a processing unit, such as at least some of the example method 800 of FIG. 8, at least some of the example method 900 of FIG. 9, and/or at least some of the example method 1000 of FIG. 10, for example. In another such embodiment, the processor-executable instructions 1106 may be configured to implement a system, such as at least some of the exemplary environment 100 of FIG. 1, for example. Many such computer-readable media may be devised by those of ordinary skill in the art that are configured to operate in accordance with one or more of the techniques presented herein.

Moreover, "exemplary" is used herein to mean serving as an example, instance, illustration, etc., and not necessarily as advantageous. As used in this application, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes," "having," "has," "with," or variants thereof are used in either the detailed description or the claims, such terms are intended to be inclusive in a manner similar to the term "comprising."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc., for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for generating a projection image from volumetric data, comprising:
   acquiring volumetric data yielded from an examination of an object via radiation;
   defining a surface about which a projection image of the object to be generated is focused;
   mapping a first portion of the volumetric data, corresponding to a first view, to a first location on the surface based on a first intersection of at least one ray and the first location on the surface;
   mapping a second portion of the volumetric data, corresponding to a second view, to a second location on the surface based on a second intersection of at least one other ray and second location on the surface; and
   generating the projection image from the volumetric data based upon the mapping a first portion and the mapping a second portion.

2. The method of claim 1, the mapping a first portion comprising:
   determining a first trajectory between a radiation source emitting the radiation during the first view and a predefined location on a first detector cell;
   identifying a first intersection between the first trajectory and the first location on the surface;
   and mapping first data yielded from the first detector cell and corresponding the first view to the first intersection.

3. The method of claim 2, the mapping a first portion further comprising:
   determining a second trajectory between the radiation source during the first view and a predefined location on a second detector cell;
   identifying a second intersection between the second trajectory and a third location on the surface; and
   mapping second data yielded from the second detector cell and corresponding to the first view to the second intersection.

4. The method of claim 3, comprising:
   determining a first characteristic of a first pixel of the projection image based upon the first data; and
   determining a second characteristic of a second pixel of the projection image based upon the second data.

5. The method of claim 2, the mapping a second portion comprising:
   determining a second trajectory between the radiation source during the second view and the predefined location on the first detector cell;
   identifying a second intersection between the second trajectory and the second location on the surface; and
   mapping second data yielded from the first detector cell and corresponding to the second view to the second intersection.

6. The method of claim 5, the first trajectory different than the second trajectory.

7. The method of claim 5, comprising:
   determining a first characteristic of a first pixel of the projection image based upon the first data; and
   determining a second characteristic of a second pixel of the projection image based upon the second data.

8. The method of claim 7, wherein at least one of the first characteristic or the second characteristic is an intensity characteristic.

9. The method of claim 1, wherein the volumetric data represents merely a slice of the object.

10. The method of claim 1, wherein the surface is planar.

11. The method of claim 1, wherein the surface is non-planar.

12. The method of claim 1, the defining a surface comprising:
    identifying, based upon the volumetric data, a region of the object that is of interest; and
    defining the surface based upon the region of the object that is of interest.

13. The method of claim 1, wherein:
    the mapping a first portion comprises:
       determining a first trajectory between a radiation source emitting the radiation during the first view and a predefined location on a first detector cell;
       identifying the first intersection between the first trajectory and the first location on the surface;
       mapping first data yielded from the first detector cell and corresponding the first view to the first intersection;
       determining a second trajectory between the radiation source during the first view and a predefined location on a second detector cell;
       identifying the second intersection between the second trajectory and a third location on the surface; and
       mapping second data yielded from the second detector cell and corresponding to the second view to the second intersection; and the mapping a second portion comprises:
- determining a third trajectory between the radiation source during the second view and the predefined location on the first detector cell;
- identifying a third intersection between the third trajectory and the second location on the surface; and
- mapping third data yielded from the first detector cell and corresponding to the second view to the third intersection.

14. The method of claim 1, wherein the surface comprises a topological manifold.

15. The method of claim 1, wherein the surface lies outside of the object.

* * * * *